June 22, 1948.  J. M. TYLER ET AL  2,443,969
VIBRATION PICK-UP
Filed March 12, 1946  2 Sheets-Sheet 2
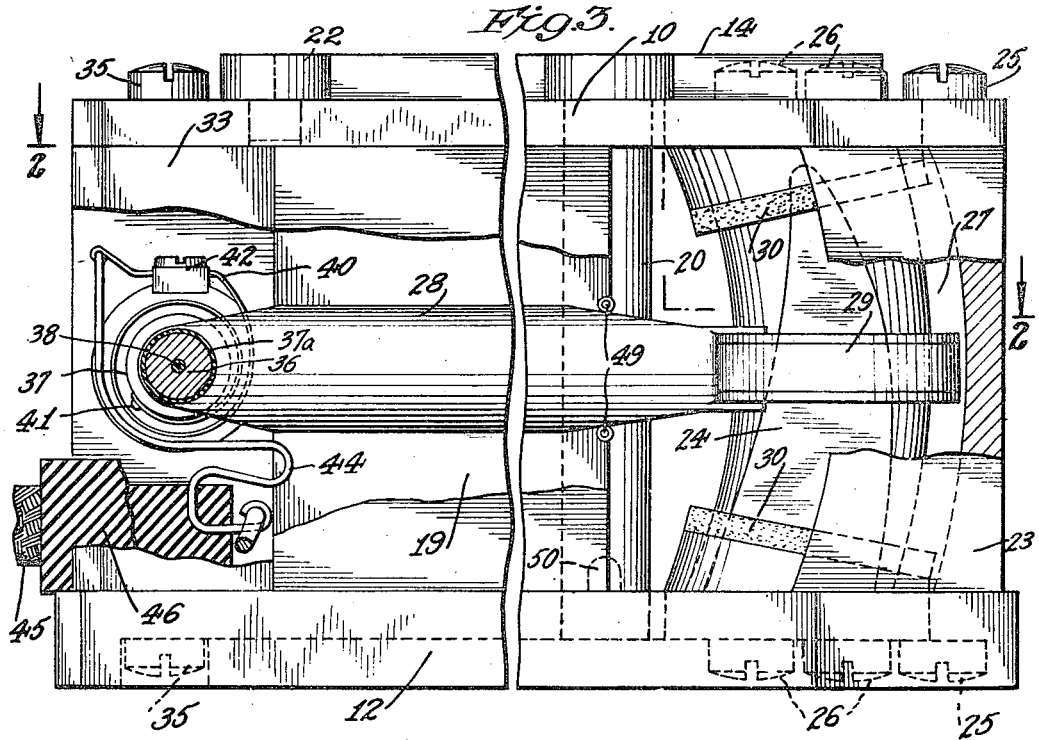
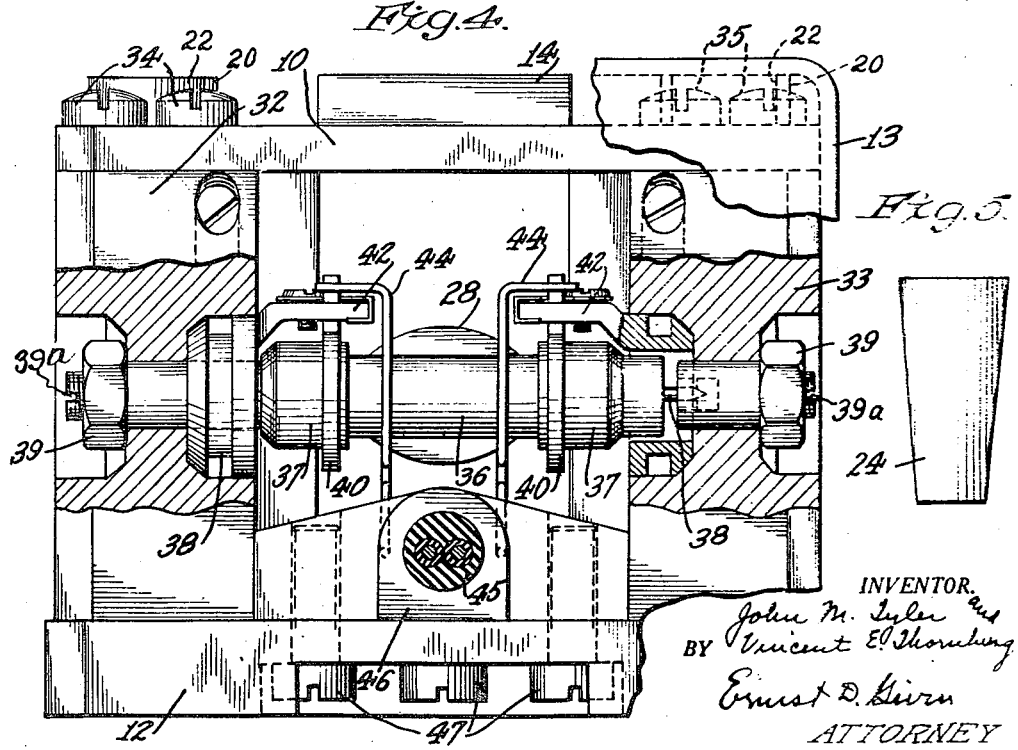
INVENTOR.
John M. Tyler and
BY Vincent E. Thornburg
Ernest D. Given
ATTORNEY Patented June 22, 1948

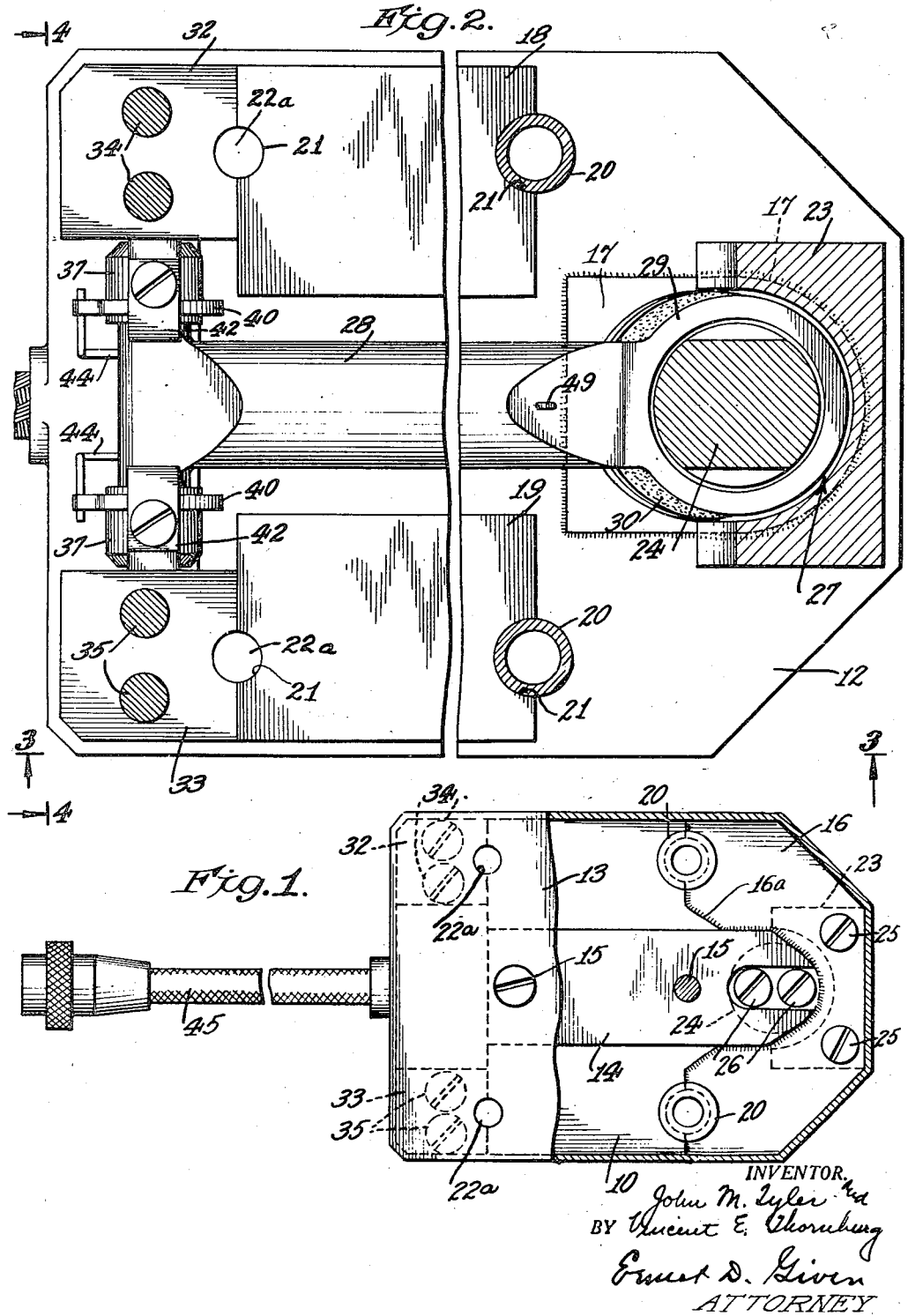

2,443,969

UNITED STATES PATENT OFFICE 2,443,969

VIBRATION PICKUP

John M. Tyler and Vincent E. Thornburg, West Hartford, Conn., assignors to United Aircraft Corporation, East Hartford, Conn., a corporation of Delaware Application March 12, 1946, Serial No. 653,898

9 Claims. (Cl. 171—209)

This invention relates to vibration measuring instruments such as are adapted to translate mechanical vibrations into proportional and readily readable electrical voltages, and it has for its object to provide a novel and improved device of this type.

Another object of the invention is to simplify the construction and increase the operating efficiency of a vibration pick-up of the type in which the vibration to be measured causes movement of a magnetic field relative to an electrical coil supported on a pivoted arm so that the frequency and magnitude of the vibration may be determined by measuring the output voltage of the coil.

Another object is to provide a novel combination of pole pieces and pivotally mounted coil support in a vibration pick-up of the foregoing type, whereby the magnetic field through which the coil passes is maintained of uniform concentration or strength throughout the range of the coil movement, and whereby the pivoted support is damped magnetically instead of mechanically as has been customary in the prior art.

Still another object is to provide a vibration pick-up of the type described having novel and improved details of construction and features of operation.

Various other objects and advantages will be apparent as the nature of the invention is more fully disclosed.

The vibration pick-up disclosed herein for the purpose of illustrating the invention is of the seismic type in which the "movable" element comprising a pivoted arm remains more or less stationary in space while the frame of the instrument vibrates with the object to which it is secured, such as the power plant of an airplane. Thus, the relative displacement between the "movable" arm and the frame of the instrument is proportional to the displacement of the vibration which is being measured. Attached to the "movable" arm of the instrument is a coil of wire which threads an air gap in a magnetic circuit which includes the frame of the device; hence the electromotive force induced in the coil element is proportional to the relative velocity of the coil with respect to the frame, and is also proportional to the velocity of the vibration being measured.

A particular feature of the invention resides in the novel construction of the magnetic circuit which includes a pair of permanent magnets secured between top and bottom plates of the frame, and inner and outer pole pieces which are also secured between said top and bottom plates. The movable coil, wound on a conducting spool and mounted on the end of an arm pivoted in jewel bearings, swings through the air gap between the inner and outer pole pieces, and these pole pieces may be curved in partially toroidal shape to provide maximum generation of voltage consistent with suitable clearances between the coil and the pole pieces. This construction permits magnetic damping of the pivoted arm coil support as distinguished from the fluid type of damping usually employed in vibration pick-ups. It also insures increased responsiveness to vibrations of low acceleration resulting from the extremely low frictional characteristics of the coil supports. It furthermore provides better response characteristics over a wider operating frequency range due to the low natural frequency of the instrument resulting from our construction.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Figure 1 is a plan view of an instrument embodying the present invention, with part of the protective cover broken away to show the interior;

Fig. 2 is an enlarged horizontal sectional view of the instrument taken on line 2—2 of Fig. 3;

Fig. 3 is a vertical sectional view taken on line 3—3 of Fig. 2;

Fig. 4 is a vertical sectional view taken on line 4—4 of Fig. 2; and

Fig. 5 is an end view of the inner pole piece, illustrating the tapered construction thereof.

In the following description certain specific terms are used for convenience in referring to the various details of the invention. These terms, however, are to be interpreted as broadly as the state of the art will permit.

The vibration pick-up shown in the drawings comprises a top plate 10 and a bottom plate 12 of similar shape, the bottom plate being slightly larger in area than the top plate to provide a perimetral seat for the protective cover 13 which enclose the instrument as indicated in Figs. 1 and 4. The top plate 10 has a raised central portion 14 to which the cover 13 is secured as by means of screws 15.

The top plate 10 is a composite piece made of soft iron with one end section 16 thereof made of non-magnetic material such as brass, the juncture of the iron and brass being indicated by line 16a in Fig. 1. The bottom plate 12 is likewise a composite piece made of soft iron with a brass or other suitable non-magnetic insert 17 as shown in Fig. 2. The purpose of this special composite construction of plates 10 and 12 will be described presently.

Two identical permanent magnets 18 and 19 are mounted in spaced parallel relation on opposite sides of the instrument, being clamped between the top and bottom plates 10 and 12. The magnets have semi-cylindrical grooves 21 on both ends thereof. The groove 21 on one end of each magnet straddles a hollow post 20. The groove 21 on the other end of each magnet mates with a similar semi-cylindrical groove in post 32 or 33, as the case may be, to form through mounting holes 22a, as best shown in Fig. 2. The top plate 10 has cylindrical inserts 22 which register with the through mounting holes 22a and form abutments for spacing and supporting the cover 13. The magnets 18 and 19 are magnetized in a direction parallel to the grooves 21 and furnish magnetic flux energy in the air gap between the outer and inner pole pieces which will now be described.

The outer pole piece 23 and the inner pole piece 24 are secured between the top and bottom plates 10 and 12 of the instrument by screws 25 and 26, respectively. The inner pole piece 24 is curved or partially toroidal; and the outer pole piece 23, which partly surrounds the inner pole piece, is hollowed out in the same partially toroidal shape and is spaced from the inner pole piece so as to provide essentially maximum flux density in the air gap 27 between the two pole pieces. The inner pole piece 24 is also tapered longitudinally at the sides, as illustrated in Figs. 3 and 5, for the purpose of compensating for the non-symmetry of the magnetic structure and thus obtaining the desired, substantially uniform, flux distribution, in the air gap.

The "movable" element of the instrument comprises a pivoted arm 28 supported in a manner hereinafter described and carrying on its free end an electrical coil 29 which is wound on a suitable annular conducting spool and surrounds the inner pole piece 24 so that it is free to swing through the air gap 27, as shown in Figs. 2 and 3. Bumper blocks 30 are provided adjacent to both ends of the inner pole piece 24 to limit the travel of coil 29 and its supporting arm 28 to a predetermined range, and these bumpers are shaped and positioned to be engaged by the entire annular rim of the coil so as to apply a relatively uniform cushioning effect across the whole surface of the coil and thereby eliminate distortion of the arm assembly.

Magnetic flux is carried from the permanent magnets 18 and 19 to the outer pole piece 23 by means of the soft iron bottom plate 12 which affords a continuous flux path to the outer pole piece 23 but not to the inner pole piece 24 which is secured to the non-magnetic insert 17 of the bottom plate. The flux which enters the outer pole piece 23 from the bottom plate leaks across the air gap 27 to the inner pole piece 24 and is finally returned to the permanent magnets by means of the top plate 10. It will be noted that the top plate 10 affords a continuous flux path of soft iron from the inner pole piece 24 to the permanent magnets, but not from the outer pole piece 23 to the magnets because the outer pole piece is secured to the non-magnetic section 16 of the top plate 10 as shown in Fig. 1. Due to the tapering of the sides of the inner pole piece 24, as described above, the distribution of flux is such that the voltage induced in the coil 29 is, for a given velocity of vibration, essentially equal at all positions of the coil from one end of its travel to the other.

The movable arm 28 carrying the coil 29 is pivotally supported in spaced end posts or blocks 32 and 33 which are secured between the top and bottom plates 10 and 12 by screws 34 and 35, respectively. The arm 28 is supported by a tubular arbor or shaft 36, which, in turn, is pivotally supported in substantially frictionless jewel bearings 38 in the end posts 32 and 33 of the instrument and may be adjusted for end clearance by means of the screws 39a which may be locked by the nuts 39, as shown in Fig. 4. In the embodiment illustrated, the elements 36 and 28 are thin walled tubes soldered together so as to provide extremely high natural frequencies of the arm 28 and coil 29 vibrating on its mounting in any mode other than the normal mode of vibration involving distortion of the coiled hair springs 40 which are two in number and have one end secured at 41 to the respective tubular members 37, insulated electrically from the shaft 36 by an insulating bushing 37a and the other end fastened in the respective clamps 42 which are secured to the end posts 32 and 33 of the instrument, as shown in Figs. 3 and 4.

The electrical output of the coil 29 is transmitted through the hair springs 40 which are suitably insulated from the clamps 42, to the leads 44 and thence to the electrical cable 45 the terminal plug 46 of which is secured to the instrument by screws 47. The hair spring clamps 42 may be adjusted to apply a twisting movement to the arm 28 by winding up the springs 40 to compensate for the effect of gravity on the arm in cases where the instrument is used in a position which requires such compensation.

In operation, the vibration pick-up is rigidly secured to an engine or other apparatus, the vibration characteristics of which are to be determined. For example, the instrument may be secured to the test apparatus by screws or bolts extending through the hollow posts 20 and the holes 22a previously described. As the test apparatus vibrates, the housing of the pick-up also vibrates, with the same frequency and amplitude of vibration. Because of the inertia of the pivoted arm 28 and coil 29, and because it is mounted with little friction on the relatively small diameter jeweled bearings, the housing of the instrument will be moved during its vibration with respect to the coil 29 mounted on the end of the arm 28. The resulting voltage, generated by movements of the magnetic field relative to the coil 29, may be measured to indicate the frequency and amplitude of the housing (and consequently the test apparatus) vibration. While the arm 28 and the coil 29 thereon are practically unrestrained, mechanically speaking, they are damped in movement by the magnetic and electrical effects created by the movement of the magnetic field relative to the conducting ring or spool upon which the coil is supported.

In the embodiment illustrated, two eyelets 49 are provided on the arm 28 to be used in measuring vibrations of very light bodies without adding any appreciable weight to such bodies by the attachment of the pick-up instrument. This is accomplished by attaching a thread or fine wire from one of the eyelets 49 through a suitable hole in the housing of the instrument to the vibrating body and attaching a soft coil spring from the other eyelet to an eye in a screw 50 in the pick-up housing.

Although a specific embodiment has been shown and described herein for purposes of illustration, it will be evident to those skilled in the art that the invention is capable of various other modifications and adaptations within the scope of the appended claims.

What is claimed is:

1. A vibration pick-up instrument adapted to translate mechanical vibrations into proportional electric voltages, comprising top and bottom plates composed of magnetic material, magnetizing means mounted between said top and bottom plates, an inner pole piece secured between said top and bottom plates, an outer pole piece secured between said top and bottom plates partly surrounding said inner pole piece, said magnetizing means furnishing magnetic flux energy through the air gap between said pole pieces, a pivoted arm mounted between said top and bottom plates, an electrical coil wound on an annular spool carried by said arm, said coil surrounding said inner pole piece and being freely movable through the air gap between said pole pieces, and means for transmitting the electrical output of said coil.

2. A vibration pick-up instrument adapted to translate mechanical vibrations into proportional electric voltages, comprising top and bottom plates composed of soft iron having sections adjacent one end thereof composed of non-magnetic material, magnets mounted in spaced relation between the iron portions of said top and bottom plates, a curved inner pole piece secured to the iron portion of said top plate and to the non-magnetic section of said bottom plate, a similarly curved outer pole piece partly surrounding said inner pole piece, said outer pole piece being secured to the iron portion of said bottom plate and to the non-magnetic section of said top plate, said permanent magnets being magnetized in a direction to furnish magnetic flux energy through the air gap between said pole pieces, a pivoted arm mounted in substantially frictionless bearings between said top and bottom plates, an electrical coil wound on an annular conducting spool carried by said arm, said coil surrounding said inner pole piece and being freely movable through the air gap between said pole pieces, and means for transmitting the electrical output of said coil.

3. A vibration pick-up instrument adapted to translate mechanical vibrations into proportional electric voltages, comprising top and bottom plates composed of soft iron having sections adjacent one end thereof composed of non-magnetic material, permanent magnets mounted in spaced relation between the iron portions of said top and bottom plates, a curved inner pole piece secured to the iron portion of said top plate and to the non-magnetic section of said bottom plate, a similarly curved outer pole piece partly surrounding said inner pole piece, said outer pole piece being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arm mounted in substantially frictionless bearings between said top and bottom plates, an electrical coil wound on an annular conducting spool carried by said arm, said coil surrounding said inner pole piece and being freely movable through the air gap between said pole pieces, means for balancing said arm, and means for transmitting the electrical output of said coil.

4. A vibration pick-up instrument adapted to translate mechanical vibrations into proportional electric voltages, comprising top and bottom plates composed of soft iron having sections adjacent one end thereof composed of non-magnetic material, permanent magnets mounted in spaced relation between the iron portions of said top and bottom plates, a curved inner pole piece secured to the iron portion of said top plate and to the non-magnetic section of said bottom plate, a similarly curved outer pole piece partly surrounding said inner pole piece and spaced and shaped to provide uniform flux density in the air gap between said pole pieces, said outer pole pieces being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arbor mounted in substantially frictionless bearings between said top and bottom plates, an arm carried by said arbor, an electrical coil wound on an annular conducting spool carried by said arm, said coil surrounding said inner pole piece and being freely movable through the air gap between said pole pieces, means for balancing said arm, and means for transmitting the electrical output of said coil.

5. A vibration pick-up instrument adapted to translate mechanical vibrations into proportional electric voltages, comprising top and bottom plates composed of soft iron having sections adjacent one end thereof composed of non-magnetic material, a pair of permanent magnets mounted in spaced relation between the iron portions of said top and bottom plates, an inner pole piece of partially toroidal shape having tapered sides secured to the iron portion of said top plate and to the non-magnetic section of said bottom plate, an outer pole piece of partially toroidal shape partly surrounding said inner pole piece and spaced therefrom to provide uniform flux density in the air gap between said pole pieces, said outer pole piece being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arbor mounted in substantially frictionless bearings between said top and bottom plates, an arm carried by said arbor, an electrical coil wound on an annular conducting spool carried by said arm, said coil surrounding said inner pole piece and being freely movable through the air gap between said pole pieces, means for balancing said arm, and means for transmitting the electrical output of said coil.

6. A vibration pick-up instrument adapted to translate mechanical vibrations into proportional electric voltages, comprising top and bottom plates composed of soft iron having sections adjacent one end thereof composed of non-magnetic material, a pair of identical permanent magnets mounted in spaced relation between the iron portions of said top and bottom plates, an inner pole piece of partially toroidal shape having tapered sides secured to the iron portion of said top plate and to the non-magnetic section of said bottom plate, an outer pole piece of partially toroidal shape partly surrounding said inner pole piece and spaced therefrom to provide uniform flux density in the air gap between said pole pieces, said outer pole piece being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arbor mounted in substantially frictionless bearings between said top and bottom plates, an arm carried by said arbor, an electrical coil wound on an annular conducting spool carried by said arm, said coil surrounding said inner pole piece and being freely movable through the air gap between said pole pieces, bumper blocks mounted adjacent the ends of said inner pole piece to limit the travel of said coil, said bumper blocks being shaped and positioned to engage substantially the entire annular surface of said coil to afford a uniform cushioning effect thereto, means for balancing said arm, and means for transmitting the electrical output of said coil.

7. A vibration pick-up instrument adapted to translate mechanical vibrations into proportional electric voltages, comprising top and bottom plates composed of soft iron having sections adjacent one end thereof composed of non-magnetic material, a pair of identical permanent magnets mounted in spaced relation between the iron portions of said top and bottom plates, an inner pole piece of partially toroidal shape having tapered sides secured to the iron portion of said top plate and to the non-magnetic section of said bottom plate, an outer pole piece of partially toroidal shape partly surrounding said inner pole piece and spaced therefrom to provide uniform flux density in the air gap between said pole pieces, said outer pole piece being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arbor mounted in substantially frictionless bearings between said top and bottom plates, an arm carried by said arbor, an electrical coil wound on an annular conducting spool carried by said arm, said coil surrounding said inner pole piece and being freely movable through the air gap between said pole pieces, coiled hair springs of conducting material secured to said arbor for balancing said arm, said hair springs being electrically connected to said coil, and terminal conductors connected to said hair springs for transmitting the electrical output of said coil.

8. A vibration pick-up instrument adapted to translate mechanical vibrations into proportional electric voltages, comprising top and bottom plates composed of soft iron having sections adjacent one end thereof composed of non-magnetic material, a pair of identical permanent magnets mounted in spaced relation between the iron portions of said top and bottom plates, an inner pole piece of partially toroidal shape having tapered sides secured to the iron portion of said top plate and to the non-magnetic section of said bottom plate, an outer pole piece of partially toroidal shape partly surrounding said inner pole piece and spaced therefrom to provide uniform flux density in the air gap between said pole pieces, said outer pole piece being secured to the iron portion of said bottom plate and to the non-magnetic section of said top plate, said permanent magnets being magnetized in a direction to furnish magnetic flux energy in a path extending through said bottom plate, outer pole piece, air gap, inner pole piece and top plate, a pivoted arbor mounted in substantially frictionless bearings between said top and bottom plates, an arm carried by said arbor, an electrical coil wound on an annular conducting spool carried by said arm, said coil surrounding said inner pole piece and being freely movable through the air gap between said pole pieces, bumper blocks mounted adjacent the ends of said inner pole piece to limit the travel of said coil, said bumper blocks being shaped and positioned to engage substantially the entire annular surface of said coil to afford a uniform cushioning effect thereto, coiled hair springs of conducting material secured to said arbor for balancing said arm, said hair springs being electrically connected to said coil, and terminal conductors connected to said hair springs for transmitting the electrical output of said coil.

9. In a device for electrically sensing the frequency and amplitude of mechanical vibrations, a frame comprising spaced plates of magnetic material rigidly secured to a pair of spacer blocks, an arm between said plates pivoted by substantially frictionless bearings on said spacer blocks, an annular coil carried by said arm and movable therewith in a circular arc, an inner pole piece of magnetic material extending through said coil and mechanically connected to both of said plates, an outer pole piece of magnetic material on the outside of said coil and mechanically connected to both of said plates, said inner and outer pole pieces being separated by a curved flux gap forming a path for movement of said coil relative to said pole pieces, and means for magnetically separating said inner pole piece from one of said plates and said outer pole piece from the other of said plates.

JOHN M. TYLER.
VINCENT E. THORNBURG.

REFERENCES CITED

The following references are of record in the file of this patent:

UNITED STATES PATENTS

| Number | Name | Date |
|---|---|---|
| 1,961,007 | Marvin | May 29, 1934 |
| 2,271,864 | Honnell | Feb. 3, 1942 |
| 2,417,077 | Hoover | Mar. 11, 1947 |
| 2,390,187 | Sharpe | Dec. 4, 1945 |